(12) United States Patent
Jacobson

(10) Patent No.: US 8,528,516 B2
(45) Date of Patent: *Sep. 10, 2013

(54) OIL TANK BREATHER LINE SOLENOID VALVE

(76) Inventor: William Lyle Jacobson, Burlington, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/550,305

(22) Filed: Jul. 16, 2012

(65) Prior Publication Data

US 2012/0298069 A1   Nov. 29, 2012

Related U.S. Application Data

(63) Continuation of application No. 12/829,086, filed on Jul. 1, 2010, now Pat. No. 8,225,766.

(60) Provisional application No. 61/246,347, filed on Sep. 28, 2009.

(51) Int. Cl.
  *F01M 11/10*   (2006.01)
  *F02B 77/08*   (2006.01)

(52) U.S. Cl.
  USPC ................ 123/196 S; 123/198 D; 184/6.4

(58) Field of Classification Search
  USPC ................ 123/196 R, 196 S, 196 CP, 198 D; 184/6.4
  See application file for complete search history.

(56) References Cited

U.S. PATENT DOCUMENTS

| 3,712,405 | A | * | 1/1973 | Dillmann ................ 180/282 |
| 3,938,613 | A | | 2/1976 | Raborn |
| 4,106,470 | A | * | 8/1978 | San Sebastian Saizar .... 123/198 DB |
| 4,762,968 | A | | 8/1988 | Hilton |
| 4,912,338 | A | | 3/1990 | Bingham |
| 5,301,644 | A | * | 4/1994 | Olmr ................ 123/198 DB |
| 6,626,140 | B2 | | 9/2003 | Aichinger et al. |
| 2004/0244832 | A1 | | 12/2004 | Sonnlietner et al. |

* cited by examiner

*Primary Examiner* — Noah Kamen
(74) *Attorney, Agent, or Firm* — Dwayne E. Rogge; Schacht Law Office, Inc.

(57) ABSTRACT

Disclosed herein is a device which provides a safety measure to vehicles by utilizing the dead man (tether) switch, or other electrical connection, in combination with a valve and actuator, to keep oil from leaking out of the lubrication system of the vehicle in a rollover situation.

9 Claims, 4 Drawing Sheets

OIL TANK BREATHER LINE SOLENOID VALVE

RELATED APPLICATIONS

This application claims priority benefit of and is a continuation of U.S. patent application Ser. No. 12/829,086 filed on Jul. 1, 2010 incorporated herein by reference. This application also claims priority to U.S. provisional application Ser. No. 61/246,347, filed Sep. 28, 2009 also incorporated herein by reference.

BACKGROUND OF THE DISCLOSURE a) Field of the Disclosure

Disclosed herein is the description of a rollover oil valve assembly and method for retrofitting vehicles for said rollover oil valve assembly. In one form, the vehicle may be a snowmobile, a four-wheel ATV or a similar off-road vehicle.

SUMMARY OF THE DISCLOSURE

Tethered dead man switches, such as disclosed in U.S. Pat. No. 3,938,613 (incorporated herein by reference), are well known in the art of off-road vehicles. These switches generally utilize a tether, coupled between a vehicle operator and a vehicle ignition system. When the vehicle operator is removed from the vehicle, the tether switch is opened and the ignition system of the vehicle is shut off. This has shown to be a significant safety measure, as the vehicle would otherwise continue to run, potentially damaging itself, or injuring the operator, or others. As is well known in the art, it can be very dangerous to the user, or damaging to the vehicle, if the vehicle is allowed to continue forward without an operator controlling the speed and direction of the vehicle. This is especially problematic in many types of watercraft, three or four wheel ATV's, and snowmobiles, which can very easily continue forward in a straight line on their own for a long period of time.

Disclosed herein is a device which provides an additional safety measure by utilizing in one form the dead man (tether) or kill switch, switch previously described, in combination with a valve and actuator, to keep oil from leaking out of the lubrication system of the vehicle in a rollover situation. Many prior art dead man switches, tethered or otherwise, operated by opening the switch, and "shutting off" power to the ignition system of the vehicle, but had no provision for containing fluids within the engine, fuel, or lubrication systems.

An additional problem is often caused in off-road vehicular accidents due to the arrangement of the engine oil tank relative to the engine air intake or other oil lines leading to or from the engine oil tank. Often, the engine oil tank is vented or otherwise fluidly coupled in such a way that when the vehicle is in an overturned orientation, the engine oil within the engine oil tank drains out of the engine oil tank. The oil is not recoverable when the vehicle is returned to an upright position.

Disclosed herein is a method and apparatus for utilizing a dead man switch in combination with a valve, arranged such that when the tether switch is activated, a signal is sent to the valve to close said valve. In one form, the signal closes the valve so that oil is prohibited from running past the valve and being lost to the environment, causing damage to environment, and potentially damaging the engine when the engine is re-started.

DESCRIPTION OF THE PREFERRED EMBODIMENTS

Figure 1:
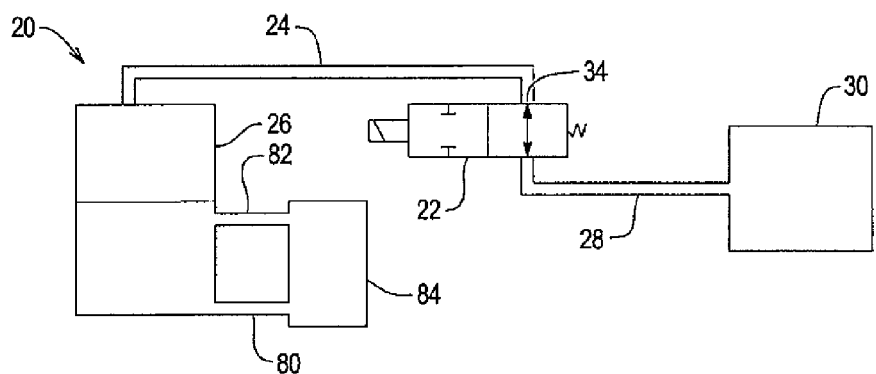
FIG. 1 is a schematic diagram of the fluid connections between an engine oil tank and a vent, such as an engine air intake box, in one form.

FIG. 1 is a schematic diagram of an oil shutoff system 20 in one form, comprising an electric solenoid control valve 22, which is fluidly coupled to a connecting hose 24 running to an engine oil tank 26. While other valves could be utilized, including pneumatic, spring, hydraulic, non-solenoid electric, or others, the primary disclosed embodiment will describe an electric solenoid control actuator in mechanical communication with the valve 22. A supply line 80 and return line 82 are fluidly connected between the oil tank 26 and the engine 84. The electric solenoid control valve 22 may be coupled to a connecting hose 28, fluidly coupled between the valve 22 and a vent 30, engine block, or, in one embodiment, an engine air intake box 30. In one form, it is often found that venting the engine oil tank 26 through the engine air intake box provides significant advantages including that the air intake box filters air to the engine oil, and also allows blow-by gasses to vent to atmosphere without building up pressure in the oil tank 26.

Two different lubrication systems are common in internal combustion engines; dry sump and wet sump. Four stroke engines commonly used in snowmobiles, ATVs, motorcycles, race engines, aircraft, etc. often use dry sump oiling systems which have several advantages over wet sump systems. In a dry sump system, the oil supply is stored in a tank, thus oil capacity is increased relative to wet sump systems. A shallow oil pan can be used in such dry sump systems to allow the engine to sit very low in the chassis, and, because the oil supply is at the bottom of the tank, oil supply is improved in rough terrain use. Dry sump systems use two or more oil pumps. A supply pump provides pressurized oil to lubricate internal engine parts and a scavenge or return pump is utilized to remove the oil from the bottom of the engine and send it back to the tank. The two pumps can be incorporated into one pump unit having separate input ports and output ports for the supply and return oil lines. Such a pump unit would typically have two portions, these being a supply portion and a return portion. Because the rate of oil return can be different than the rate of supply, the oil tank is normally vented to as previously discussed, to prevent tank pressure buildup (or vacuum). Tank pressure buildup can cause poor oil scavenging performance and could lead to oil system failure. Some factors that can change the supply to scavenge rate are rapid RPM changes and compression gases leaking past the piston rings, often referred to as blow by gases. These blow by gases increase crankcase pressure, which can increase the scavenge pump flow rate. The change in flow rate can in some instances raise or lower the oil level in the tank, which can create undesirable tank pressure if not vented correctly.

Figure 2:
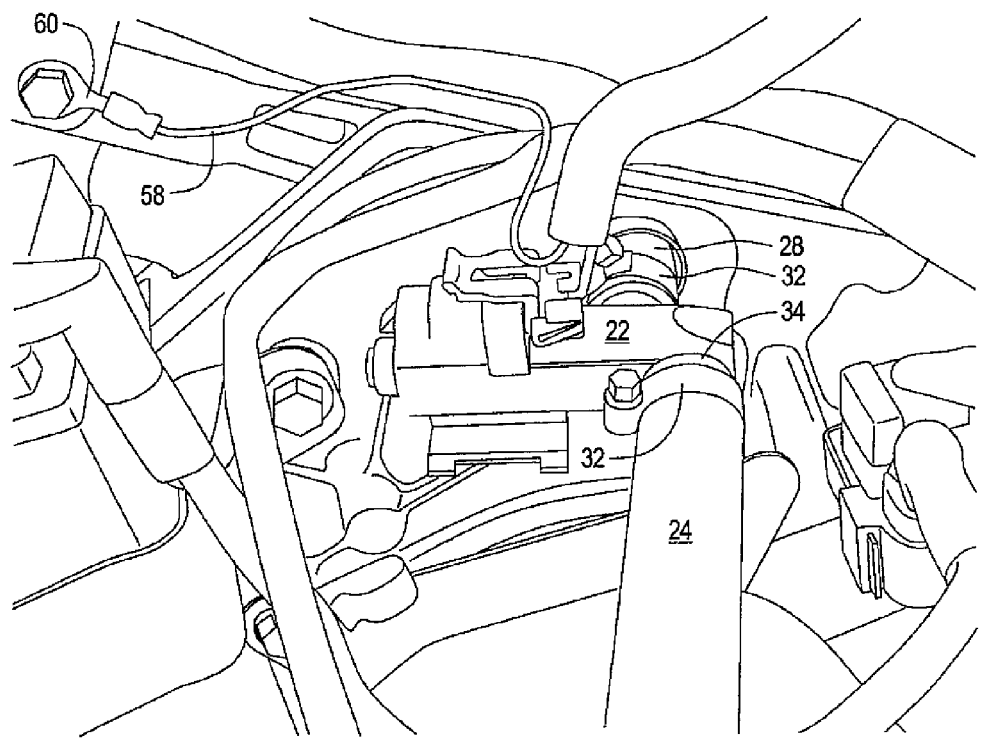
FIG. 2 is a drawing of an installed oil line solenoid valve, in one form.

Looking to FIG. 2, the electric solenoid control valve 22 is shown coupled to the connecting hose 28 and further coupled to the engine air intake box or other assembly. As shown in this embodiment, a plurality of hose clamps 32 can be utilized to ensure a pressure-retaining seal between the connecting hoses 24/28 and the solenoid 22. The input side 34 of the oil line solenoid 22 is coupled to the connecting hose 24, which delivers tank vapors to the oil line solenoid 22 from the engine oil tank 26 in normal operating conditions. As previously mentioned, the tether switch is activated when the user is removed from the vehicle, and power is cut from the engine, shutting off the engine. Concurrently, in one form, power is supplied to a normally open oil line solenoid 22, shutting the valve. While it may be alternately possible or desired to incorporate a normally closed oil line solenoid valve 22, having a normally closed valve could cause a problem in some instances. In one example, in the event of loss of power supplied to the valve, such as by a dead battery, the valve would close, potentially causing damage to the engine. As these vehicles are often used very far from assistance in the backcountry, such damage could be catastrophic to the rider. By utilizing a normally open valve, this situation is eliminated as the valve will remain open when power is lost to the valve.

Figure 4:
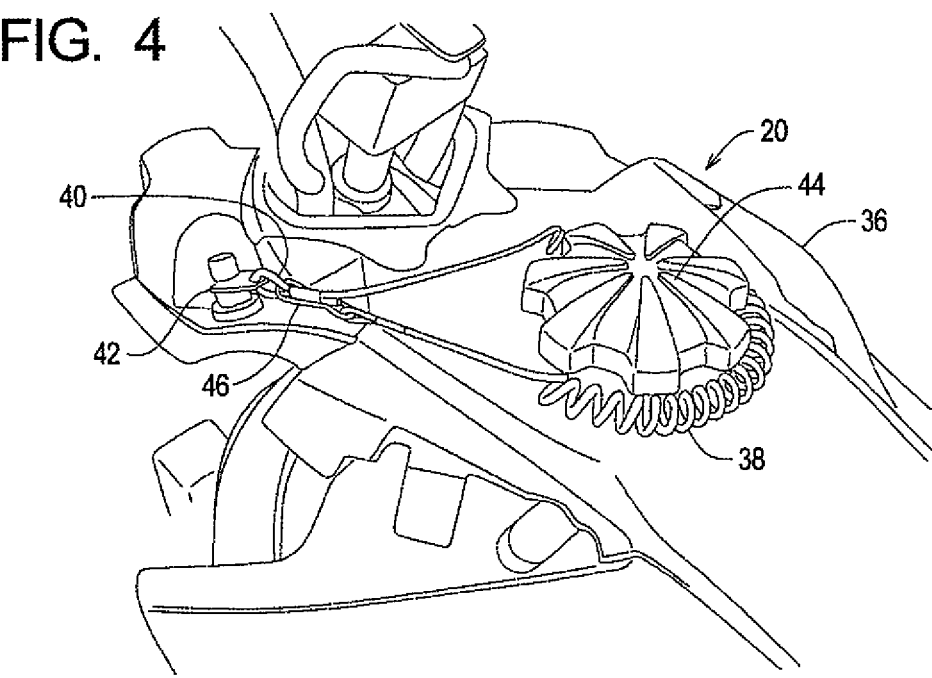
FIG. 4 is a drawing of a tether attached to a vehicle, in one form.

FIG. 4 shows one embodiment of the oil shut off system 20 being utilized on a snowmobile 36, although, as previously discussed, the system 20 could equally be utilized on other vehicles. As shown, the cowling of the snowmobile has been removed so that the front part of the engine compartment can be easily seen. The tether 38 is shown having a first end 40 coupled to the tether control switch 42. The tether 38 is shown in a stowed position wherein it is wrapped around the gas cap 44 and back to the tether coupling 46. In normal operation, the tether coupling 46 would be attached to the driver, such that when the driver is not in a position to properly control the vehicle, such as being removed therefrom, the tether switch 42 is activated shutting off the vehicle. As previously discussed, when the tether switch 42 is activated, the solenoid control valve 22 will close, keeping oil from leaking out through the oil line vent 30. When the vehicle is returned to an upright position, the tether 38 is reattached to the tether switch 42, opening the valve 22, allowing tank vapors to circulate through the system, such that the vehicle 36 can be restarted.

Figure 3:
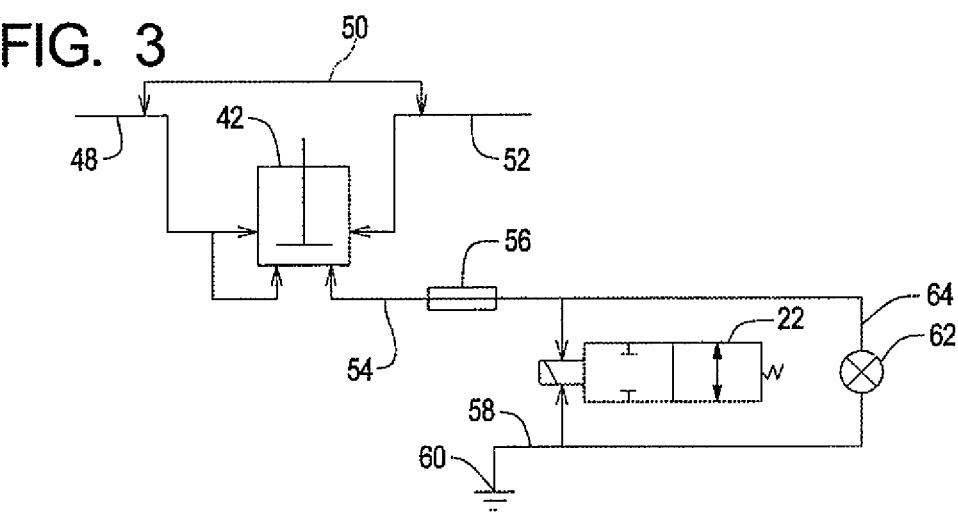
FIG. 3 is a schematic diagram of the electric connections in an oil line solenoid valve shutoff system, in one form.
Figure 5:
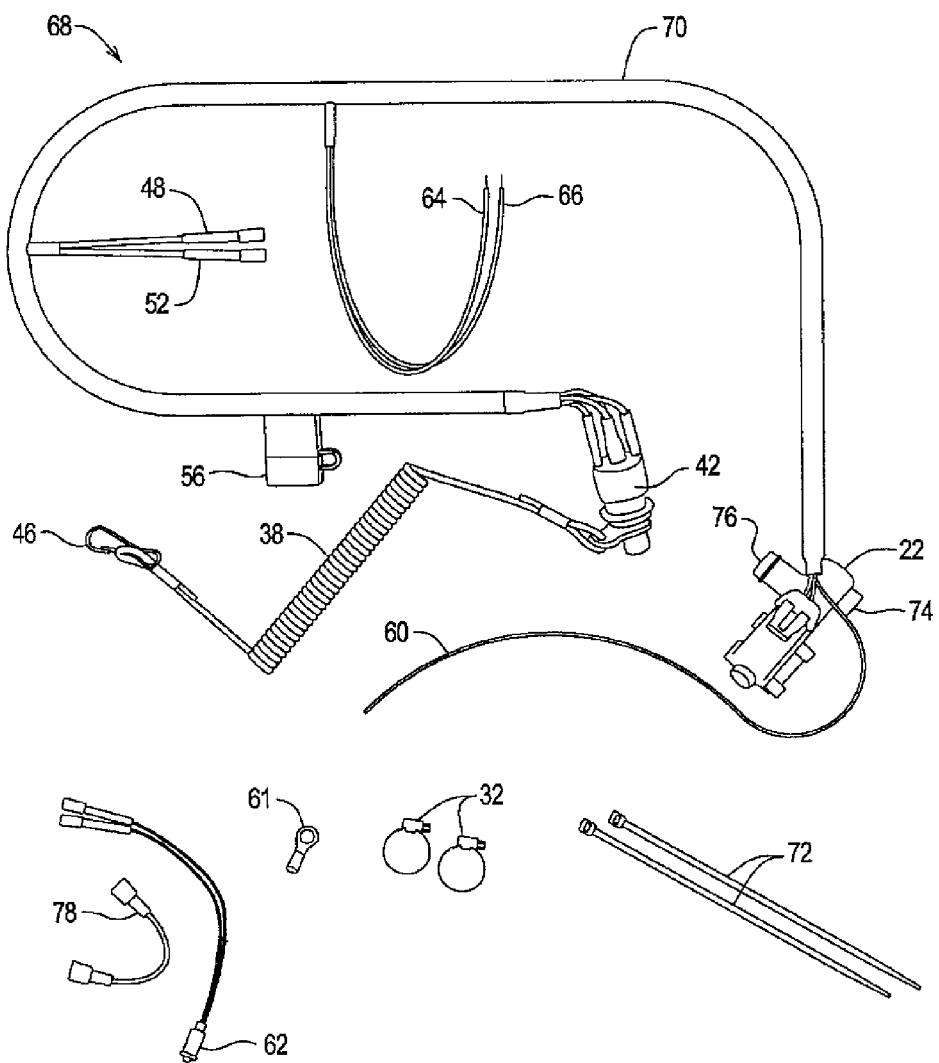
FIG. 5 is a drawing of a retrofit kit for an oil line solenoid valve shutoff system, in one form.

The schematic diagram shown in FIG. 3 shows one embodiment for interconnecting the individual components to achieve the desired outcome. In one form, the tether switch is wired in series with the factory mounted handlebar kill switch. The tether switch 42 is shown coupled to the "hot side" 48 of a kill switch wire which may lead to the ignition switch of the vehicle. In one form, a double pole single throw switch is utilized for the tether switch 42. The output side of the tether switch 42 in one form is coupled to leads 52 and 54. The lead 52 couples to the power input source (cold side) of the vehicle kill switch (in one form the vehicle handlebar OEM kill switch), and the lead 54 is coupled to the input side of the electric solenoid valve 22, in one form, through a fuse 56. In one form, a three-amp, in-line fuse can be utilized. In one form, the output lead 58 from the solenoid control valve 22 connects to the ground at a grounding plug 60. The lead 58, or grounding wire, is also shown in FIG. 2. In one form, it may be desired to have an audio or visual signal to indicate the status of the solenoid control valve 22. In one form, as shown in FIGS. 3 and 5, a light or LED 62 can be connected by way of leads 64 and 66 to illuminate when power is supplied to the solenoid control valve 22 and indicate that the valve is in the closed position.

Figure 6:
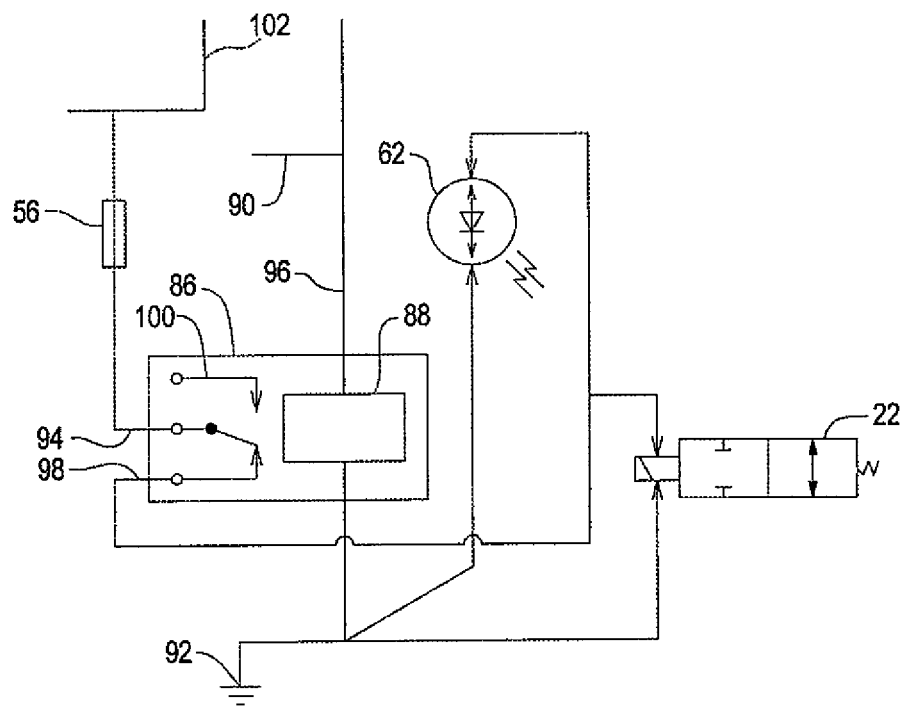
FIG. 6 is a schematic diagram of the electric connections in an oil line solenoid valve shutoff system, in one form.

In another embodiment, shown in FIG. 6, a control relay 86 is used instead of the double pole tether switch 42 previously described. In this embodiment, the coil of the control relay 86 is electrically coupled between the fuel pump wire 90 and ground 92 by way of a lead wire. Thus, when power is supplied to the fuel pump, the relay coil 88 is energized, and the normally open terminal 100 is closed to the common terminal 94. To engage the disclosed rollover valve, the user engages the kill switch while leaving the key in the on position; this stops the engine and power is cut from the fuel pump, the relay coil 88 is not energized, and the normally closed terminal 98 is closed to the common terminal 94. Alternatively to connecting to the fuel pump power supply, the relay coil 88 could alternatively be coupled to a standard handlebar kill switch. As the normally closed terminal 98 is coupled to the normally open solenoid valve 22, power to the normally closed terminal 98 would close the solenoid 22, which is fluidically coupled as described above. A fuse 56 may be interposed between the power supply line 102 and the common terminal 94. In one form, the power supply line 102 is coupled to the ignition switch such as to have power supplied only when the ignition key is on.

In another form, the leads 102 and 90 are connected to the terminals of a normally closed type tether switch. During engine operation the tether switch contacts are closed, allowing the engine to run and supplying power to the relay coil 88. This energizes the relay coil 88, and closes the circuit between the common terminals 94 and 100. Thus power is not supplied to the terminal 98, and the solenoid valve 22. This allows the valve to remain open and vent the oil tank.

When the tether is pulled, the contacts on the tether switch open, stopping the engine and cutting power to the relay coil 88. This allows the contacts to close between terminals 94 and 98, which in turn supplies power to the solenoid valve 22, closing the solenoid valve 22. This allows for operation of the solenoid valve 22 even when the ignition key is in the on position during the rollover event.

In one form, as shown in FIG. 6, an indicator 62, as previously described, can be utilized to indicate to a driver that the solenoid valve 22 is closed, and that the vehicle should not be started.

Looking to FIG. 5 is shown a retrofit kit 68, in one form. The kit is utilized for converting a vehicle, such as a snowmobile, to utilize the embodiments of the disclosure. The kit 68 in one form comprises a wiring harness 70. The wiring harness 70 connects the solenoid control valve 22 to the tether switch 42 and also comprises the leads 48 and 52, which would be coupled to an existing kill switch. The wiring harness 70 also comprises the leads 64 and 66, which would be coupled to the LED indicator 62. The ground wire 60 is also shown, as well as a grounding plug 61, which would couple the grounding wire 60 to the vehicle such as at the frame. The in-line fuse 56 is also provided as a portion of the wiring harness 70. A tether 38 and a tether coupling 46 are also shown. The jumper wire 78 can be utilized as an emergency device in case of losing the tether, or in failure of the tether switch 42. If the tether switch 42 fails, the tether switch can be "jumped" with the jumper wire 78 to re-open the solenoid valve 22. To utilize the jumper wire 78 in case of failure of the tether switch, the tether switch would first be disconnected from the wiring harness and then wire 48 could be jumped to wire 52, bypassing the tether switch. The jumper wire 78 could also be used in a similar manner in the event of failure of the kill switch. A plurality of zip ties 72 or similar attachment devices may also be included, as well as a plurality of hose clamps 32, to couple the fluid input 74 and fluid output 76 of the solenoid control valve 22, as previously discussed.

A wireless tether could also be utilized. Such wireless tethers are becoming better known, and they generally activate the tether switch when the user wearing the transmitting portion becomes removed from the vehicle. A manual reset is often utilized in such a system, such that the ignition and oil line valve will not automatically become active when the user returns to the vehicle. This is important, as the vehicle may not be in an upright position or may be otherwise unusable.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. An oil shutoff system for a vehicle, the shutoff system comprising:
   a. a control valve having a valve inlet, a valve outlet, and a valve actuator;
   b. the control valve coupled in an oil line between an oil system of the vehicle, and atmosphere so as to close the oil line when the control valve is in a closed position;
   c. wherein the control valve is a normally open control valve;
   d. wherein the valve actuator is an electrically actuated solenoid;
   e. wherein the valve actuator is configured to hold the control valve open until a tether switch is actuated;
   f. the control valve inlet configured to be fluidly coupled to an engine oil tank via an oil passageway;
   g. the control valve outlet configured to be fluidly coupled to atmosphere; and
   h. wherein the valve actuator is configured to be electrically coupled to the tether switch, so as to close the control valve when the tether switch is actuated so as to close the oil passageway.

2. The oil shutoff system as recited in claim 1 wherein the control valve outlet is configured to be fluidly coupled to atmosphere through an engine air intake.

3. An oil shutoff system comprising:
   a. a control valve having a valve inlet, a valve outlet, and a valve actuator;
   b. the valve inlet fluidly coupled to the engine oil tank;
   c. the valve outlet fluidly coupled to atmosphere.

4. The oil shutoff system as recited in claim 3 wherein the valve actuator is electrically coupled, to close the control valve when the engine is not in operation.

5. The oil shutoff system as recited in claim 3 wherein the control valve is a normally open control valve.

6. The oil shutoff system as recited in claim 3 wherein the valve actuator is an electrically actuated solenoid.

7. The oil shutoff system as recited in claim 3 wherein the valve actuator is configured to remain open until a tether switch is closed.

8. The oil shutoff system as recited in claim 3 wherein the valve actuator is configured to remain open until power is no longer provided to a fuel pump.

9. The oil shutoff system as recited in claim 8 further comprising a relay comprising:
   a. a common electrical connection coupled to an ignition switch;
   b. a normally closed electrical connection coupled to the valve actuator, and;
   c. a relay coil electrical connection magnetically coupled to the common electrical connection and electrically coupled to the fuel pump.

* * * * *